April 1, 1952
H. J. OGORZALY
2,591,595
METHOD FOR CONTROLLING THE TEMPERATURE
OF EXOTHERMIC REACTIONS, SUCH AS THE
GASIFICATION OF CARBONACEOUS SOLIDS
Filed Sept. 29, 1949
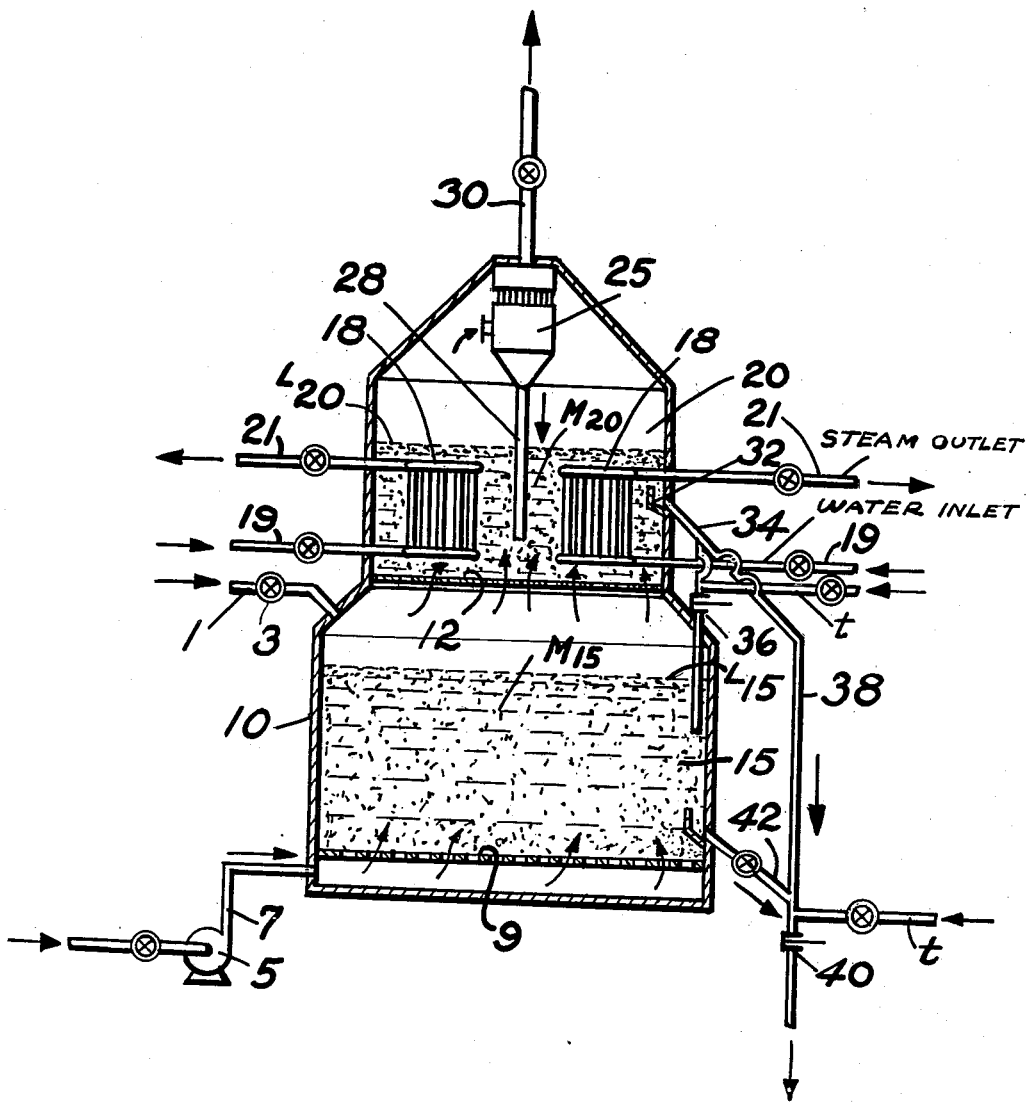
Henry J. Ogorzaly Inventor
By J. Cashman Attorney

UNITED STATES PATENT OFFICE 2,591,595

METHOD FOR CONTROLLING THE TEMPERATURE OF EXOTHERMIC REACTIONS SUCH AS THE GASIFICATION OF CARBONACEOUS SOLIDS

Henry J. Ogorzaly, Summit, N. J., assignor to Standard Oil Development Company, a corporation of Delaware Application September 29, 1949, Serial No. 118,688

5 Claims. (Cl. 48—203)

The present invention relates to an improved method for controlling the temperature of exothermic reactions such as the gasification of carbonaceous solids to produce gas mixtures rich in carbon monoxide, the roasting of sulfidic ores, etc. More particularly, the invention is concerned with an improved method for controlling the reaction temperature as well as the quality and temperature of the product gas in the roasting of sulfidic ores or in the gasification by means of free oxygen of subdivided carbonaceous solids, such as all types of coal, petroleum coke, cellulosic materials including lignin, tar sands, oil shale, and other solids containing volatilizable constituents to generate a producer gas or $SO_2$ and $SO_3$ in an operation of the fluidized solids type.

The application of the so-called fluid solids technique to the gasification of solid fuels is well known in the art. In this process, the finely divided carbonaceous materials, such as coal having a fluidizable particle size ranging, say, from about 10–400 mesh, are fed to a conversion zone wherein they are maintained, at conversion temperature, in the form of a dense turbulent suspension of finely divided solids fluidized by an upwardly flowing gas. Preferably a settling zone is maintained within the upper part of the conversion zone so that the suspension of solids assumes the form of a fairly well defined bed, with a distinct interface between the dense phase, i. e. the bed, and the dilute suspension of entrained solids in the settling zone.

Fluid operation results in excellent diffusion of heat through the reaction zone and high rates of heat transfer to cooling surfaces. It is, therefore, particularly well suited for carrying out strongly exothermic gas-solid reactions wherein the heat generated is in substantial excess of that required to raise the solid reactants to the desired temperature level. However, conventional methods of applying the fluid solids technique to exothermic reactions of the type specified are not entirely satisfactory when the reaction occurs at very high temperature levels, such as are required for the manufacture of producer gas.

In such cases the ordinary methods of the fluid solids technique for controlling the temperature level of the reaction zone are not entirely satisfactory. For example, at coal gasification temperatures, cooling surface immersed in a fluid bed is subject to corrosive attack and to rapid failure in case of a momentary stoppage in the flow of the coolant. If external cooling circuits are employed, refractory materials must be used to line the solids withdrawal line because of the high temperature level of the operation. In some cases, concurrent endothermic reactions may be employed to control the bed temperature, as for example steam may be reacted with incandescent carbon; this reaction is relatively slow and generally incomplete so that the cost of manufacturing and subsequently condensing the unconverted steam is an economic burden to the operation. In the manufacture of producer or water gas from carbonizable solids, such as coals of all types, a further problem arises due to the tarry vapors which are carried overhead and which condense on cooling. These vapors must be removed in special purification equipment to prevent serious difficulties in the transportation and use of the product gas. This problem is present in all producer gas processes, and is not confined to fluid solids operation.

Prior to the present invention it has been suggested to pass solids and gases in countercurrent flow through a plurality of superimposed fluidized beds, feeding solids at a relatively low temperature to the uppermost bed. However, this procedure does not supply a solution to the difficulty of controlling the temperature of a highly exothermic reaction and, in fact, aggravates the situation because of the recovery and return to the reaction zone of sensible heat in the issuing streams.

The present invention overcomes the aforementioned difficulties and affords additional advantages as will be fully understood from the following detailed description read with reference to the accompanying drawing.

In accordance with the present invention, the exothermic gasification of carbonaceous solids or similar exothermic reactions are carried out in the fluidized state by supplying the subdivided fresh solids charge to a gasification or reaction zone maintained at reaction temperature by the exothermic heat of reaction, fluidizing the solids in the reaction zone by the rising flow of gaseous reactants to form a dense turbulent mass of solids having a more or less well defined upper interface therein, and passing the hot gaseous reaction products and entrained solids from the upper interface directly into a cooling zone superimposed on the reaction zone and separated from the latter by a perforated plate or similar gas distributing means, so as to form a second fluidized bed of solids above the distributing means. The fluidized solids bed in the cooling zone is maintained at substantially lower temperature than the reaction zone by means of cooling surfaces immersed in this fluidized solids bed. Temperature control in the reaction zone is effected by returning controlled amounts of solids from the fluidized bed in the cooling zone directly to the fluidized bed in the reaction zone, preferably by means of a standpipe connecting the two beds. Product gases are recovered from the top of the cooling zone, if desired, after separation of entrained solids which may be returned to the cooling zone. Product solids are preferably recovered from the fluidized bed in the cooling zone, except for the elimination of large sized particles and for cleaning out slagged lumps, which may take place directly from a lower portion of the reaction zone.

The operation of this system is substantially automatic. Gas and fresh solids feed rates to the reaction zone may be maintained at predetermined levels. The temperature of the fluidized solids in the cooling zone is maintained at the desired low level by controlling the heat removal from the cooling bed through the immersed cooling surfaces. The temperature of the fluidized solids in the reaction zone is lowered by increasing the rate of cooled solids return from the cooling zone to the reaction zone and raised by reducing this solids return rate. The rate of solids carry-over from the reaction zone to the cooling zone in the form of solids-in-gas entrainment is a function of the bed level in the reaction zone and, therefore, automatically maintains an approximate balance with the solids return rate, as the level of solids in the reaction zone rises or falls to compensate for adjustment in the rate of return of cooled solid.

It will be appreciated that operation in accordance with the present invention permits a full utilization of the beneficial features of the fluid solids technique while greatly alleviating or completely eliminating the difficulties mentioned above. Thus, the reaction is carried out and the excess heat is removed with the benefit of the excellent heat transfer characteristics of fluidized beds. The high temperature reaction zone, which requires special high-temperature resistant construction materials and/or water cooling of exposed surfaces, is limited in extent. It does not include heat transfer equipment, dust recovery equipment or product handling equipment. The product gases are considerably reduced in volume, because they are recovered exclusively from the cooling zone, which permits the use of smaller recovery equipment. The lower temperature at which the product gas is recovered allows the use of ordinary metals for the recovery equipment. Similar advantages result for the recovery equipment for the product solids which are likewise recovered at a reduced temperature. In addition, the heat balance of the system is improved by virtue of the lower temperatures of gas and solid withdrawal. Most important for the gasification of carbonaceous solids of the type specified above is the fact that all vapors of high-boiling tarry materials evolved in the high-temperature gasification zone proper are removed from the product gas by deposition on the cool fluidized solids in the upper cooling zone, permitting the recovery of a clean product gas without special cleaning equipment. Excessive tarring-up of the upper bed and resulting fluidization troubles are avoided by the continuous recycle of cooled solid to the high temperature reaction zone wherein these deposits are cracked, converted and/or burned to form additional amounts of product gas.

Prior to the present invention, it has been suggested to reduce the volume of product gases carrying solids entrainment from a fluid-type exothermic reaction zone by passing the hot product gas through a fluidized solids bed maintained at a substantially lower temperature than reaction temperature (see U. S. Patent No. 2,420,542). However, neither the idea of using cool solids circulating from such a cooling zone to the reaction zone to control the temperature of an exothermic reaction zone in a substantially automatic manner as above described nor the concept of utilizing this circulation of solid from a cool zone to a high temperature zone to effect decomposition of tarry substances recovered from the gaseous stream passing through the cool zone have been suggested in this art.

Fluidization and solids treating conditions in the reaction and cooling zones of the process of the present invention may vary within wide ranges depending on the type of solids to be treated and the reaction involved. In the production of producer gas from coal or similar carbonaceous solids, the coal may be supplied to the high temperature reaction zone at a particle size of about 10-400 mesh. Gas flow velocities in the two zones may vary between about 0.3 and 5 ft. per second depending on the coal particle size so as to establish fluidized solids phases having an apparent density of about 10-30 lbs. per cu. ft. and a solids entrainment in the gases leaving the fluidized phases, of about 0.002-0.10 lb. per cu. ft. Holding time in the gasification zone may be of the order of 10-200 minutes and the pressure drop across the grid or the like supporting the cooling bed may be of the order of 0.25-1 p. s. i. g. with grid openings of the order of about 0.25-4 in. Suitable gasification temperatures to be maintained in the reaction zone proper fall within the approximate range of 1500°-2500° F., and are preferably maintained at about 1700°-1900° F. The temperature in the cooling zone should be kept below the dew point of the tarry materials to be removed from the product gas, e. g. at a temperature of about 500°-800° F. in the case of operation at atmospheric or moderately increased pressure of, say, less than about 150 p. s. i. g. The solids circulation rate from the cooling zone to the gasification zone depends, of course, on the desired temperature differential between the two zones as well as on the extent of gasification and the quality of the producer gas. It may be stated, however, that solids circulation rates from the cooling zone to the gasification zone of about 10-100 lbs. per 100 lbs. of fresh coal charged are generally adequate at gasification temperatures of about 1700°-1900° F. and cooling zone temperatures of about 500°-1000° F.

Having set forth its general nature, the invention will be best understood from the more detailed description hereinafter in which the invention will be described with reference to the accompanying drawing, the single figure of which is a diagrammatic illustration of a system suitable for carrying out a preferred embodiment of the invention.

Referring now to the drawing, the system shown therein essentially comprises a treating unit 10 divided by a grid 12 into a lower reaction zone 15 and an upper cooling zone 20 whose functions and cooperation will be forthwith explained using the production of about 12.5 MM. cu. ft. of producer gas per day from a Pittsburgh seam carbonization coal. It will be understood, however, that the system of the drawing may be used in a generally analogous manner for the gasification of other carbonaceous solids or to carry out other exothermic reactions of fluidized solids.

In operation, subdivided coal may be supplied to reaction zone 15 through line 1 by any suitable means for conveying subdivided solids, such as an aerated standpipe, a screw conveyor, lock hoppers, or the like. The coal may have a particle size of, say, about —35 mesh and a composition about as follows:

| | Per cent |
|---|---|
| Moisture | 5.0 |
| Carbon | 62.4 |
| $H_2$ | 4.2 |
| $O_2$ | 5.5 |
| $N_2$ | 1.3 |
| S | 1.6 |
| Ash | 20.0 |

For the purposes of the present example, the coal feed rate through line 1 may be controlled by flow control means, such as slide valve 3 at about 140 lbs./min.

Air and/or oxygen, which during the starting period may be preheated to temperatures above the ignition point of the coal is supplied by blower or compressor 5 via line 7 to the bottom of reaction zone 15 which it enters through suitable gas distributing means such as grid 9. The air feed rate is so controlled that sufficient oxygen is made available for an incomplete combustion of the carbonaceous constituents of the coal within a coal residence time of about 30 minutes to produce in a highly exothermic reaction a product gas having about the following composition:

| | | | |
|---|---|---|---|
| $H_2O$ | 2.7 | CO | 24.4 |
| $H_2$ | 11.2 | $N_2$ | 57.8 |
| $CO_2$ | 3.6 | $H_2S$ | 0.3 |

An air feed rate of about 46.5 standard cu. ft. per lb. of coal fed is adequate for this purpose. The superficial linear velocity of the gases within zone 15 is preferably maintained at about 1–1.3 ft. per second by a suitable design of zone 15. At these conditions the solids in zone 15 form a dense, highly turbulent, fluidized mass $M_{15}$ resembling a boiling liquid having a more or less well defined upper level $L_{15}$ and an apparent density of about 15 lbs. per cu. ft. The temperature within mass $M_{15}$ is maintained at about 1700°–1900° F. as will be apparent hereinafter.

At the flow conditions specified, a substantial amount of solids, say about .01 lb. per cu. ft., is fully entrained in the upwardly flowing gases and carried as a dilute solids-in-gas suspension beyond level $L_{15}$ through grid 12 into cooling zone 20. The openings of grid 12 are preferably of the order of 1 in. to permit the free passage of the entrained solids and to afford an adequate support for a fluidized mass above grid 12. Cooling zone 20 is provided with suitable cooling means, such as cooling coils 18, wherein water supplied through lines 19 may be converted into steam recovered through lines 21. Cooling coils 18 are so operated that cooling zone 20 is maintained at a temperature of about 600°–800° F. In order to compensate for the substantial gas contraction resulting from the lower temperature in zone 20, the cross-section of zone 20 may be suitably reduced as shown in the drawing. In this manner, the superficial linear velocity of the gases may be maintained about the same as that in zone 15 so that a fluidized solids mass $M_{20}$ having a level $L_{20}$ forms above grid 12.

When operating as described above, full advantage is taken of the excellent heat transfer and distribution characteristics of the fluid solids technique, both in reaction zone 15 and in cooling zone 20. In addition, all condensible constituents boiling above the temperature maintained in zone 20 are condensed therein, deposited on the fluidized solids and thus removed from the product gas which may be recovered through line 30 at the low temperature of zone 20, if desired via a conventional gas-solids separation system such as one or more cyclones 25 from which separated solids may be returned to mass $M_{20}$ through dippipe 28.

The temperature of zone 15 is maintained at the desired level as follows. Cooled fluidized solids are withdrawn from mass $M_{20}$ at a point intermediate between grid 12 and level $L_{20}$ via a withdrawal well 32 and standpipe 34 aerated through tap $t$ and ending at a point below level $L_{15}$ of mass $M_{15}$. The rate of solids flow through standpipe 34 is controlled by slide valve 36 so as to maintain in mass $M_{15}$ a temperature of about 1700°–1900° F. as mentioned above. At the conditions of this example, a solids flow rate through standpipe 34 of about 22 lbs. per 100 lbs. of fresh coal charged is adequate for this purpose. The tarry deposits returned to zone 15 together with the solids are substantially converted into gases in zone 15 whereby an undesirable accumulation of these deposits in zone 20 is effectively prevented.

Ash containing about 25% of carbon is likewise withdrawn from zone 20 at the low temperature of the latter, for example through an aerated standpipe 38 at a rate controlled by a slide valve 40. The ash withdrawn amounts to about 25 weight per cent of the coal charged. If an undesirably high proportion of coarse solid aggregates has concentrated in the bottom portions of zone 15, these may be removed through line 42 and, if desired, mixed with the cool coke in standpipe 38 for recovery. At the conditions of the present example, the coarse aggregates so removed at the high temperature of zone 15 will rarely exceed about 5 weight per cent of the coal charged.

If desired, steam produced in coils 18 may be added to the air supplied to zone 15 to increase the $H_2$ content of the product gas in a manner known per se. Since the carbon-steam reaction is endothermic, the solids circulation rate through standpipe 34 may be proportionately decreased in this case.

While the present invention affords greatest advantages for the gasification of carbonizable solids, it may also be adapted to various other exothermic processes, such as the roasting of sulfide ores and others, in a manner obvious to those skilled in the art.

For example, when the invention is applied to the roasting of zinc sulfide concentrates the system illustrated may be employed substantially as described above with the following differences. The amount of exothermic heat generated by the combustion of the sulfur to $SO_2$ is extremely large and, as a consequence, considerably larger amounts of solids must be recycled from the cooling to the roasting zone than is the case when incomplete combustion of carbon with the production of a large proportion of CO is practiced as described above. For example, when maintaining the roasting zone at a temperature level of 1800° F. and the cooling zone at a temperature level of 800° F. from 500–1000 lbs. of solids must be so recycled per 100 lbs. of fresh charge. In this case, the particular advantage is gained that a clean roasting gas containing between 10 and 15% SO$_2$ may be produced with consequent economy in subsequent operations for the recovery of SO$_2$. In conventional roasting operations, the temperature of the roasting zone must be maintained at the desired level of 1800° F. by the use of a large excess of combustion air with resulting dilution of the roaster gas and inefficiency in heat recovery. Other sulfidic ores such as iron pyrites may be roasted in a substantially analogous manner.

The foregoing description and exemplary operations have served to illustrate preferred embodiments of the invention but are not intended to be limiting in scope.

What is claimed is:

1. In the high-temperature treatment of subdivided solids with gases reacting exothermically with said solids to form a product gas and a solid reaction product in a reaction zone wherein said solids are maintained in the form of a dense, turbulent mass fluidized by upwardly flowing gases, product gas containing a substantial proportion of solids entrained is withdrawn upwardly from said mass and passed upwardly through a second fluidized solids mass maintained at a temperature substantially below said high temperature by means of heat exchange with a cooling agent and solids are returned from said second mass to said reaction zone, the improvement which comprises feeding fresh solids to said first named mass returning solids at said lower temperature from said second mass to said first named mass at a rate controlled to limit said high temperature at a desired maximum level by a direct heat exchange between said returned solids and said first named mass, withdrawing product gas upwardly from said second mass and recovering solid reaction product from said second mass independently of said product gas.

2. The process of claim 1 in which said solids are carbonaceous and said reaction comprises gasification with a gas containing free oxygen.

3. The process of claim 1 in which said solids are a sulfidic ore and said reaction comprises roasting of said ore with a gas containing free oxygen.

4. In the exothermic high temperature gasification of carbonizable solids maintained in the form of a dense, turbulent, fluidized mass of subdivided solids to produce a gas rich in CO, the improvement which comprises withdrawing product gas containing entrained therein a substantial proportion of carbonaceous solids upwardly from said mass, forming a second dense turbulent solids mass fluidized by said product gas from said entrained solids above said first-named mass, cooling said second mass substantially below said gasification temperature so as to deposit at least a major proportion of tarry constituents of said product gas on said second mass, returning solids at said lower temperature from said second mass to said first-named mass at a rate controlled to maintain said gasification temperature at a desired level, withdrawing product gas upwardly from said second mass and removing solid gasification residue from said second mass, separately from said product gas.

5. The process of claim 4 wherein said carbonizable solids are coal, said gasification temperature is about 1700°–1900° F., said lower temperature about 500°–1000° F., and said rate about 10–100 lbs. of returning solids per 100 lbs. of fresh carbonizable solids charged.

HENRY J. OGORZALY.

REFERENCES CITED

The following references are of record in the file of this patent:

UNITED STATES PATENTS

| Number | Name | Date |
|---|---|---|
| 2,414,883 | Martin | Jan. 28, 1947 |